United States Patent [19]

Brown et al.

[11] 4,052,278

[45] Oct. 4, 1977

[54] FINELY DIVIDED, IRRADIATED TETRAFLUORETHYLENE POLYMERS

[75] Inventors: Michael Trevenen Brown, Welwyn Garden City; William George Rodway, Welwyn, both of England

[73] Assignee: Imperial Chemical Industries Limited, London, England

[21] Appl. No.: 498,219

[22] Filed: Aug. 16, 1974

Related U.S. Application Data

[63] Continuation of Ser. No. 346,243, March 30, 1973, abandoned, which is a continuation-in-part of Ser. No. 267,035, June 28, 1972, abandoned, which is a continuation-in-part of Ser. No. 111,700, Feb. 1, 1971, abandoned.

[30] Foreign Application Priority Data

Feb. 3, 1970 United Kingdom ............... 5037/70
Sept. 17, 1971 United Kingdom ............... 43436/71

[51] Int. Cl.$^2$ .......................... C08F 2/46; C08F 8/00
[52] U.S. Cl. ........................... 204/159.2; 204/159.14; 260/33.8 F; 260/33.4 F; 526/18; 526/914
[58] Field of Search .................... 260/92.1; 204/159.2

[56] References Cited

U.S. PATENT DOCUMENTS 3,766,031 10/1973 Dillon ............................ 204/159.2

FOREIGN PATENT DOCUMENTS 829,503 3/1960 United Kingdom

OTHER PUBLICATIONS

Ferse et al., Kolloid–Zeitschrift und Zeitschrift fur Polymere, vol. 219, No. 1, pp. 20–29, [and translation] 1967.
Ryan, Radiation of Polytetrafluoroethylene, Modern Plastics, vol. 31, p. 152 (1954).

*Primary Examiner*—Richard B. Turer
*Attorney, Agent, or Firm*—Cushman, Darby & Cushman

[57] ABSTRACT

Dry non-sticky fine lubricant powders are made by γ-irradiation of unsintered coagulated dispersion grade tetrafluoroethylene polymers and organic dispersions are made by dispersing the irradiated polymer in an organic medium.

4 Claims, No Drawings

FINELY DIVIDED, IRRADIATED TETRAFLUORETHYLENE POLYMERS

This application is a continuation of our copending application Ser. No. 346,243, filed Mar. 30, 1973, now abandoned, said Ser.No. 346,243 being a continuation-in-part of application Ser. No. 267,035, filed June 28, 1972, now abandoned, said application Ser. No. 267,035 itself being a continuation-in-part of Ser. No. 111,700, filed Feb. 1, 1971, and now abandoned.

This invention relates to tetrafluoroethylene polymers and tetrafluororethylene polymer compositions, especially dispersions of tetrafluoroethylene polymers in aqueous or organic media.

Polytetrafluoroethylene (PTFE) is well known for its low friction properties and an increasing use of PTFE is as a dry lubricant powder, for example in textile machinery. Such powders are also of use as lubricating or nucleating fillers for thermoplastics such as polyamides and polypropylene.

Heretofore lubricant powders have been made by thermal degradation of PTFE, for example by heating in air, or in the presence of a degradation accelerator, at a temperature of the order of 500°-600° C. Such thermally degraded PTFE powders may be comminuted, for example by milling, to a relatively small particle size but for some applications it would be desirable to decrease the size still further. We have not found it possible to mill thermally degraded powders to a number average particle size below 5 $\mu$m as measured optically. (The other well established technique of measurement of particle size of PTFE powders, namely the air permeability method, gives falsely low values for such thermally degraded powders and so particle sizes specified herein are those obtained by optical methods).

We have found that dry lubricant powders of submicron particle size may conveniently be made by irradiating certain types of PTFE and then submitting the irradiated polymer to a suitable process of comminution. We have also discovered that by submitting the irradiated polymer to an alternative, dry milling, comminution process, it is possible to obtain a form of PTFE of differing but advantageous properties.

According to one aspect of this invention there is provided an unsintered coagulated dispersion grade of a tetrafluoroethylene polymer selected from tetrafluoroethylene homopolymers and copolymers of tetrafluoroethylene with up to 10% by weight, based on the weight of the copolymer, of an ethyleneically unsaturated comonomer in powder form characterised in that the powder is capable of being comminuted to a number average particle size less than 5 $\mu$m as measured optically. It may be capable of comminution to sub-micron particle size. The invention also includes powders made by the comminution of such materials to below 5 $\mu$m, and below 1 $\mu$m, number average particle size respectively.

A process for the manufacture of a friable tetrafluoroethylene polymer powder as above described comprises subjecting in powder form an unsintered coagulated dispersion grade of a tetrafluoroethylene polymer selected from tetrafluoroethylene homopolymers and copolymers of tetrafluoroethylene with up to 10% by weight, based on the weight of the copolymer, of an ethylenically unsaturated comonomer, to $\gamma$-radiation until it has received a dose of at least 2, e.g. from 2 to 50 and preferably from 2 to 20, especially 4 to 10 M Rad. A finely divided tetrafluoroethylene polymer may then be obtained by comminuting the irradiated powder e.g. by high shear mixing in a liquid. The comminuted material has a particle size depending on the polymer treated, the radiation dose and nature of the comminution step. The number average particle size may be less than 5 $\mu$m and may be in the sub-micron range and as low as 0.3 $\mu$m and less.

In the alternative, dry milling, comminution process, an irradiated unsintered coagulated dispersion grade of a tetrafluoroethylene polymer made as above set forth is dry milled in a mill having a zone in which the polymer is subjected to impact and shear forces created by the high speed revolution of a number of hammers in a recess closely confining an outwardly directed surface of revolution of the hammers and classifier means to form a powder having decreased surface area preferably from 3-7 $m^2$/gm and comprising particles having a size, measured optically, in the range 3-4 $\mu$m, and the powder is recovered.

The classification system should preferably be such that a high mill loading is achieved, the polymer being retained in the mill for sufficient time to enable the necessary work to be done on the polymer to achieve the desired surface area and particle size.

The invention also provides e.g. made by the aforesaid process a tetrafluoroethylene polymer powder in which the polymer is a homopolymer or copolymer of tetrafluoroethylene as set out above characterised in that the powder which has been irradiated has a particle size of 3 to 4 microns measured optically, a surface area of 3-7 $m^2$/gm, preferably 3-5 $m^2$/gm and a sheen gauge result, as measured by the sheen gauge test defined below of at least 1, 2, 5, 20, smear preferably at least 0, 1, 2, 5, smear. Preferably the powder when dispersed in oil exhibits a viscosity of 100-700 cp, preferably 100-400 cp at 1 sec$^{-1}$ shear rate as measured by the viscosity test defined below.

In the sheen gauge test, 4 gm of polymer and 4 gm of clock oil R304 supplied by Bush-Boake-Allen of London are hand mixed with a spatula for 5 minutes until a paste is obtained which is of a consistency resembling that of whipped cream and is capable of forming soft peaks. A blob of the paste is placed at the deep end of a 0-25 $\mu$m graduated channel of a Fineness of Grind gauge of the Sheen type sold by Sheen Ltd. This consists of a steel plate having a channel of a depth which constantly decreases from just over 25 $\mu$m at one end to zero at the other end. Using a straight edged scraper at right angles to the gauge, the paste is drawn down the channel. The number of lines appearing in the surface of the paste at each of the 25, 20, 15 and 10 graduations and if appropriate the 5 $\mu$m graduation are counted and the point at which the channel is wiped clean is also noted. This is referred to as "smear". Thus the minimum attainment of "1, 2, 5, 20, smear" referred to above means that the number of lines appearing in the surface at the 25, 20, 15 and 10 $\mu$m graduations are respectively 1, 2, 5 and 20, and the paste smears below the 10 $\mu$m graduation. A better attainment than this would mean that there would be less lines noted at some or all of the graduations than in the quoted minimum attainment and it might smear at or below the 5 $\mu$m graduation (i.e. between 5 $\mu$m and 0 thickness). The preferred attainment of at least "0, 1, 2, 5, smear" means that the numbers of lines at the 25, 20, 15 and 10 $\mu$m graduations are equal to or less than 0, 1, 2 and 5 respectively and the paste smears below the 10 $\mu$m graduation. Preferred samples have been found to smear at or below a point corresponding to approximately 6 μm.

In the viscosity test, 18 gm of the polymer are dispersed in 42 gm of British Standard oil CSB 460 as sold by Shell Mex and B.P. Ltd. The viscosity of the dispersion is measured on a Ferranti-Shirley cone and plate viscometer.

It has been found that powders obtained by this process have a slightly smaller particle size than that of the irradiated material prior to milling but that the particular dry milling used in this invention quite surprisingly effects a reduction, typically by about one half to two thirds, in the surface area of the particles.

The following general description deals first with elements common to all aspects of the invention and then deals with the production of dispersions directly from irradiated polymer. Subsequently it deals with the particular dry milling process for the irradiated polymer and products which can be made from the dry milled material.

By the term "coagulated dispersion grade of a tetrafluoroethylene polymer" which is the starting material for the products and process of this invention there is meant those grades of polymer obtained by the coagulation of an aqueous dispersion of polymer which has been made by the polymerisation of tetrafluoroethylene or copolymerisation of tetrafluoroethylene with up to 10% by weight, based on the weight of the copolymer, of an ethylenically unsaturated comonomer, wherein the reactants are dispersed in an aqueous medium with the aid of an emulsifying agent which is generally highly fluorinated. The production of such dispersions is described in, inter alia, British patent specification 689 400. Examples of commercially available coagulated dispersion polymers are 'Fluon' CD1 and CD4 sold by Imperial Chemical Industries Limited and "Teflon" 6 and 6C sold by E I Du Pont de Nemours and Company.

Such coagulated dispersion polymers have a primary particle diameter of the order of 0.1 μm but as commercially available are somewhat sticky powders in the form of agglomerates having a mean diameter of the order of several hundred microns. Said powders are sticky in the sense that the powder can be compressed into a putty- or snowball-like material that can be broken into fibrous lumps. Shearing coagulated dispersion polymers in an attempt to reduce the particle size, for example by milling the powder, results in sticky fibrous products. However, by subjecting these coagulated dispersion grades of polymer to γ-irradiation as described above, the polymer is converted to a dry non-sticky fine friable powder that can easily be broken down, for example by rubbing between the fingers, to a number average particle size of less than 5 μm, and may be comminuted by suitable means to sub-micron particle size.

In contrast to coagulated dispersion polymers that have not been irradiated, high shear mixing of the irradiated polymer gives a more rounded, as opposed to fibrous, particle.

The irradiation has been found to increase the bulk and packing densities of the polymer.

The coagulted dispersion polymer may be irradiated by methods well known in the art. Convenient methods include irradiation by a $Co^{60}$ source or by immersing the polymer sealed in a suitable container, for example an aluminium canister, in a spent fuel element pond.

The polymer powder should be given a radiation dose of 2 M Rads or more, preferably from 2–20 M Rads, and especially 4–10 M Rads. The use of a higher dose than 20 M Rads is likely to render the process uneconomic.

One of the uses of irradiated polymer made by the above described method is in the formation of dispersions of tetrafluoroethylene polymer in aqueous and organic media.

While aqueous dispersions made by the method of the above mentioned British patent No. 689 400 may be used directly without further treatment, they are not suitable for all purposes. For example, because of a tendency to coagulate they cannot be concentrated sufficiently to enable them to form a thick paste to enable them to be spread by paste spreading techniques. Neither can their viscosity be increased by additives without fear of coagulation. It has been discovered that a dispersion of a tetrafluoroethylene polymer in an aqueous medium with desirable properties for certain applications may be prepared by simultaneously comminuting and dispersing in water a coagulated dispersion grade of a tetrafluoroethylene polymer irradiated as above described.

A dispersion of a tetrafluoroethylene polymer in an aqueous medium may be made by subjecting an irradiated tetrafluoroethylene polymer as above described to high shear mixing in the presence of an aqueous medium to break down the particles of the polymer to sub-micron size and to form a dispersion of the polymer in the medium. In contrast with coagulated dispersion grades of tetrafluoroethylene polymers as above described, the dry non-sticky fine friable powder made by the irradiation step is suitable for comminution to sub-micron size in the presence of water. Following the irradiation step, it is not necessary to comminute the polymer as this can be done in the presence of the aqueous medium, the comminution and dispersion being effected together by the high shear mixing. The high shear mixing may be performed by example by a Silverson mixer or an End Runner Mill. The aqueous dispersions made by the present invention may be used in coating applications, cosmetics, water based printing inks, greases and cutting fluids.

The irradiated polymer may also be used to make dispersions in organic media.

British Patent Specification 887 750 describes the preparation of a dispersion of a wax-like product produced by polymerising tetrafluoroethylene in the presence of specified quantities of trichlorotrifluoroethane and an active telogen under specified conditions of temperature and pressure. This process is not easy to operate because of the volatility of the trichlorotrifluoroethane and is limited in scope because the resulting product is understood to include telogen and trichlorotrifluoroethane combined with tetrafluoroethylene which is not desirable for all purposes. Consequently it is advantageous to obtain organosols of PTFE by a process not involving polymerisation in an organic medium.

A further limitation of the product of the prior specification is that it comprises a wax dispersed in the residual trichlorotrifluoroethane whereas it is desirable to be able to obtain dispersions in a variety of organic liquids, not all of which would be suitable media for a tetrafluoroethylene polymerisation reaction, for example mineral oils.

From the point of view of cost and convenience, it is clearly desirable to use a dispersion grade of a tetrafluoroethylene polymer which has been manufactured in the normal way in the presence of water. However, attempts to do this in the past have been unsuccessful.

It has been discoverd that by making use of an irradiated unsintered coagulated dispersion grade of a tetrafluoroethylene polymer as above described, it is possible to comminute and disperse the polymer in an organic liquid. The invention therefore affords a method of making a dispersion of a tetrafluoroethylene polymer in an organic liquid comprising subjecting an irradiated tetrafluoroethylene polymer as above described to high shear mixing in the presence of an organic liquid to break down the particles of the polymer to sub-micron size and to form a dispersion in the liquid.

Preferably the amount of liquid is regulated so that a gel-like dispersion is formed. Unlike the above described unsintered coagulated dispersion grades of tetrafluoroethylene polymers, the irradiated material is suitable for comminution to sub-micron size in the presence of the organic liquid. Comminution prior to admixture with the organic liquid is not necessary.

A suitable organic liquid in which to disperse the polymer is trichlorotrifluoroethane which is sold by Imperial Chemical Industries Limited under the Trade Mark 'Arklone' P.

The high shear mixing is for example performed by a Silverson mixer or an End Runner Mill.

The dispersions obtained may if desired be diluted with other solvents, for example non-flammable solvents such as trichloroethylene. Other solvents that may be used are alcohols, e.g. isopropanol, or further quantities of the solvent used for preparation of the dispersion.

The organic dispersions made by the present invention may be used for introducing tetrafluoroethylene polymers into oils and greases more conveniently than by use of previously known dry powders. The dispersions may also be used as metal forming aids, e.g. as wire drawing lubricants and may be used in sintered metal processing where they can act as lubricants on compaction of the metal especially when a second compaction is being performed.

The dispersions are also useful in the application of tetrafluoroethylene polymers as coatings e.g. by aerosol, and generally in the incorporation of polymers into other liquids.

In comminuting the irradiated polymer by high shear mixing in a liquid by the methods above set out, its surface area is increased many times.

While the dispersions so produced have been found useful for a number of purposes as indicated, it has been found that the dispersions have disadvantages for some purposes in that they can exhibit inconveniently high viscosity and thixotropic behaviour.

The discovery, referred to earlier, that if the irradiated material is subjected to a particular type of dry milling step, rather than to high shear mixing in an organic or aqueous medium, its surface area is decreased rather than increased was most surprising. Particles are produced by the dry milling step which have distinct and unexpected handling and processing properties quite unlike those of the irradiated polymer itself.

The powders produced by the particular type of dry milling, subsequently referred to as "dry milled powders" or dispersions of dry milled powders may be used advantageously in coatings and printing inks, exhibiting easier dispersion than the unmilled or wet milled irradiated polymer. In the coating field they may be incorporated into resin compositions to give low friction wear resistant coatings which have a smooth surface, high gloss and good anti-mar or scuff resistant properties.

On blending the powders with liquids, better dispersibility is obtained than if the unmilled irradiated powder is used. Wet milling of the dry milled powders does not break it down to sub-micron particle size in distinction from the unmilled material. Dispersions of the dry milled powders in organic and aqueous media are less viscous and less thixotropic than dispersions made using like amounts of dispersing medium and unmilled irradiated polymer. Dispersions of the dry milled powder may also be made more easily and less expensively than dispersions of the unmilled material as high shear mixing is not necessary. Simple mixing will suffice in many cases. Thus by stirring the dry milled powder into a liquid polyimide resin composition good dispersion may be achieved and a coating composition formed which will give a desirably smooth coat. In contrast the unmilled material would have to be subjected to severe high shear mixing in a triple roll mill in the presence of an organic solvent and subsequently blended with a polyimide resin precursor solution to form a coating material which will give a similar smooth coat.

Because of the lower viscosity of dispersions made from the dry milled powders of the invention, it is possible to spray them to form thin films more easily than dispersions made from irradiated material by high shear mixing.

In practising the particular dry milling stage which characterises the process of the invention, a suitable mill for producing the correct degree of shear and impact on the irradiated polymer is a No. 8 "Mikro-Atomizer" (Trade Mark) sold by Pulverising Machinery Division of Slick Corporation of Summit, New Jersey, U.S.A. This is preferably operated at a feed rate of greater than 100 kg/hr, the rotor being used at 3400–3450 rpm.

Other hammer mills which can be operated to produce the required impact and shear forces on the irradiated polymer may be used. However it has been found that a mill operating on different principles namely a fluid energy mill such as a "Cyclo-Jet" Mark A16 though this effects dry milling in the usual sense does not produce the powder of this invention defined above as "dry milled powder" as it has little noticeable effect on mean particle size and surface area. The resulting powder is no more easily dispersible than the feedstock and consequently is not so easily dispersible as the "dry milled" powders of this invention.

Dispersions of a tetrafluoroethylene polymer in an aqueous or organic medium may readily be made in accordance with this invention by thoroughly mixing a dry milled powder with an aqueous or organic medium to form a dispersion in the medium. Conventional stirring means such as a Hamilton-Beech stirrer may be used to form these dispersions.

A suitable organic liquid in which to disperse the polymer is trichlorotrifluoroethane which is sold by Imperial Chemical Industries Limited under the Trade Mark 'Arklone' P.

The organic dispersions obtained may if desired be diluted with other solvents, for example non-flammable solvents such as trichloroethylene. Other solvents that may be used are alcohols, e.g. isopropanol, or further quantities of the solvent used for preparation of the dispersion.

The organic dispersions made in accordance with this aspect of the present invention may be used for introducing tetrafluoroethylene polymers into oils and greases more conveniently than by use of previously known dry powders. The dispersions may also be used as metal forming aids, e.g. as wire drawing lubricants and may be used in sintered metal processing where they can act as lubricants on compaction of the metal especially when a second compaction is being performed.

The dispersions are also useful in the application of tetrafluoroethylene polymers as coatings e.g. by aerosol, and generally in the incorporation of polymers into other liquids.

The invention will be further described by reference to the following illustrative and comparative Examples.

EXAMPLE 1

A quantity of 'Fluon' CD1 coagulated dispersion PTFE powder was subjected to a dose of 5 M Rads of γ-irradiation. The resultant product was a friable fairly free flowing powder with a number average particle size of the order of 10–15 μm measured optically.

On fine disintegration in a light oil using bead milling or equivalent liquid dispersion techniques an extremely fine powder was obtained with a number average particle size of the order of 1–3 μm measured optically.

A polymer obtained by a thermal degradation process treated similarly gave a product with number average particle size of the order of 5–10 μm measured optically.

EXAMPLE 2

By way of comparison a quantity of a milled granular PTFE powder sold under the name 'Fluon' G163 was subjected to a dose of 5 M Rads of γ-irradiation. The resultant product was a friable fairly free flowing powder with a number average particle size of the order of 10–15 μm measured optically. On fine disintegration in a fluid energy mill it gave a powder with a number average particle size of the order of 5–10 μm measured optically.

A product obtained by the irradiation of 'Fluon' CD1 coagulated dispersion polymer gives a finer powder of less than 5 μm number average particle size when treated similarly.

EXAMPLE 3

A quantity of 'Fluon' CD1 coagulated dispersion PTFE powder as sold by Imperial Chemical Industries Limited was subjected to a dose of 5 M Rad of γ-irradiation. The resultant product was a friable fairly free flowing powder with a number average particle size of the order of 10 to 15 μm measured optically.

200 gm of the irradiated polymer was added to 800 gm of water in which had been dissolved 10 gm of "Empicol" 0045 (Tade Mark) (a sodium lauryl sulphate) and 4 gm of "Carbopol" 941 (Trade Mark) (composed of carboxyl vinyl polymers of extremely high molecular weight). The mixture was stirred by hand to form a slurry and placed in an End Runner Mill in which it was further mixed and comminuted for 5 hours. There resulted a paste-like dispersion of PTFE which remained free of supernatant liquor after 3 weeks standing. The "Carbopol" is used to thicken the medium. As an alternative "Viscalex" (Trade Mark) (formed of acrylic copolymers) could be used. The PTFE particles were too small to be resolved by optical microscopy and were therefore of a particle size below 0.2 μm.

The paste is useful for coating glass cloth by knife spreading to give a thick coat (0.075–0.125 mm) in one pass instead of with several passes through a dip bath as would be necessary using orthodox PTFE dispersions of the kind previously mentioned made e.g. by the method of British patent specification 689 400 and used without further treatment.

By modifying the viscosity of the paste it is possible to form a coating on one side of the glass cloth only which is of advantage when it is necessary to stick the PTFE-coated glass cloth to another surface.

EXAMPLE 4

A quantity of 'Fluon' CD1 coagulated dispersion PTFE powder as sold by Imperial Chemical Industries Limited was subjected to a dose of 5 M Rads of γ-irradiation. The resultant product was a friable fairly free flowing powder with a number average particle size of the order of 10 to 15 μm measured optically.

A Silverson EX mixer of three-horse power fitted with a 1/32 inch (0.0794 cm) screen is charged with 5 gallons of 'Arklone' P (36.32 kgm) and 20 lb (9.08 kgm) of the irradiated polymer. This corresponds to 20% by weight of polymer and 80% by weight of 'Arklone' P. The mixer is fitted with a standard diameter roter and is operated for 3½ minutes at 3000 rpm. The mixing should not be continued any longer under these conditions because the solvent has reached its boiling point. The polymer is found to have been dispersed in the 'Arklone' P to form an organosol, and to have been comminuted to a particle size below 0.2 μm.

EXAMPLE 5

In this example a laboratory Silverson mixer fitted with a 0.0794 cm mesh screen was used. 20% by weight of irradiated polymer similar to that described in Example 4 and 80% by weight of 'Arklone' P were hand mixed in a beaker and then transferred into the mixer which was then operated at maximum speed (approx. 6000 rpm). 'Arklone' P was added to make good some of the liquid losses due to evaporation. The mixer was operated for 10 minutes. There was obtained a creamy paste having approximately 40% by weight solid content, much of the 'Arklone' having evaporated. The paste stuck to the sides of a glass bottle if shaken. No settling was observed after 3 days. The PTFE particles were too small to be resolved by optical microscopy and were therefore of a size below 0.2 μm.

EXAMPLE 6

This illustrates the production of a "dry milled powder" in accordance with the invention.

25 kg. of an irradiated PTFE coagulated dispersion polymer were fed to a No. 8 "Mikro-Atomizer" mill of the kind previously described fitted with 36 separator blades 3 inch (8 cm) long on the classifier rotor and a 25 inch (64 cm) diameter fan. The original coagulated dispersion polymer was a commercial grade of coagulated dispersion polymer, manufactured by Imperial Chemical Industries Ltd., under the name 'Fluon' CD1. This was irradiated with a 5 M Rad dose of γ-radiation. The mill rotor speed was allowed to steady at 3400 – 3450 r.p.m. before feed of the polymer commenced. The polymer was then fed at a feed rate of 120 to 130 kg/hr so that the current on the mill motor was maintained between 55 and 65 amps.

The resultant product gave in separate tests Sheen Gauge Test results of 0/0/2/4/ smear and 0/0/2/2/ smear at the 25, 20, 15, 10 and 5 μm graduations. A 30% dispersion of the product in clock oil had a viscosity of 370 centipoise at 1 sec$^{-1}$ shear rate when tested on a Ferranti Shirley cone plate viscometer. The median particle size was 4 μm measured optically.

We claim:

1. An unsintered powder of a coagulated dispersion grade of a homopolymer of tetrafluoroethylene or a copolymer of tetrafluoroethylene with up to 10% by weight of the copolymer, of an ethylenically unsaturated comonomer, characterised in that the powder has been irradiated by gamma radiation until it has received a dose of from 2 to 50 M Rad, has a particle size of 3 to 5 microns measured optically, a surface area of 3–7 m$^2$/gm, and a sheen gauge result measured by the sheen gauge test of at least 1, 2, 5, 20, smear.

2. An unsintered powder of a coagulated dispersion grade of a homopolymer of tetrafluoroethylene or a copolymer of tetrafluoroethylene with up to 10% by weight of the copolymer, of an ethylenically unsaturated comonomer, characterised in that the powder has been irradiated by gamma radition until it has received a dose of from 2 to 50 M Rad, has a median number average particle size of 3 to 4 microns measured optically, a surface area of 3 to 7 m$^2$/gm, and a sheen gauge result measured by the sheet gauge test of at least 1, 2, 5, 20, smear.

3. A powder according to claim 2 wherein the surface area is from 3–5 m$^2$/gm.

4. A dispersion of a tetrafluoroethylene polymer in an aqueous or an organic medium characterised in that it comprises a polymer according to claim 2 dispersed in the medium.

* * * * *